United States Patent
Haldeman et al.

(10) Patent No.: US 10,752,349 B2
(45) Date of Patent: Aug. 25, 2020

(54) ACTIVE COUNTERWEIGHT FOR MAIN ROTOR

(71) Applicant: Bell Helicopter Textron Inc., Fort Worth, TX (US)

(72) Inventors: Andrew Paul Haldeman, Fort Worth, TX (US); Zachary Edwin Dailey, Grapevine, TX (US); Aaron Alexander Acee, Flower Mound, TX (US); Dalton T. Hampton, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 82 days.

(21) Appl. No.: 16/173,064

(22) Filed: Oct. 29, 2018

(65) Prior Publication Data

US 2020/0130823 A1    Apr. 30, 2020

(51) Int. Cl.

| | | |
|---|---|---|
| *B64C 27/605* | (2006.01) | |
| *B64C 27/06* | (2006.01) | |
| *B64C 27/00* | (2006.01) | |
| *B64C 13/04* | (2006.01) | |
| *B64C 13/40* | (2006.01) | |
| *B64C 27/72* | (2006.01) | |

(52) U.S. Cl.
CPC ........ *B64C 27/605* (2013.01); *B64C 13/0421* (2018.01); *B64C 13/40* (2013.01); *B64C 27/001* (2013.01); *B64C 27/06* (2013.01); *B64C 27/72* (2013.01); *B64C 2027/004* (2013.01); *B64C 2027/7216* (2013.01)

(58) Field of Classification Search
CPC ................ B64C 2027/7255; B64C 2027/7211
See application file for complete search history.

(56) References Cited

U.S. PATENT DOCUMENTS

| | | | |
|---|---|---|---|
| 2,795,284 A | | 6/1957 | Sikorsky |
| 3,106,964 A | * | 10/1963 | Danielson ............. B64C 27/625 416/18 |
| 6,616,095 B2 | | 9/2003 | Stamps et al. |
| 9,090,334 B2 | | 7/2015 | Covington, Jr. et al. |
| 2014/0034777 A1 | | 2/2014 | Fenny |
| 2016/0059960 A1 | * | 3/2016 | Fearn .................... B64C 27/022 244/17.11 |

* cited by examiner

*Primary Examiner* — Igor Kershteyn
*Assistant Examiner* — Juan G Flores
(74) *Attorney, Agent, or Firm* — Shackelford, Bowen, McKinley & Norton, LLP

(57) ABSTRACT

An exemplary rotorcraft includes a power train with an engine coupled to a gearbox, a main rotor blade having a mast coupled to the power train, a control input linkage in communication between a pilot input device and the main rotor blade configured to communicate a control input force from the pilot input device to the main rotor blade, and a counterweight system in connection with the control input linkage and the power train to apply a centrifugal force to the control input linkage.

19 Claims, 4 Drawing Sheets

ACTIVE COUNTERWEIGHT FOR MAIN ROTOR

BACKGROUND

This section provides background information to facilitate a better understanding of the various aspects of the disclosure. It should be understood that the statements in this section of this document are to be read in this light, and not as admissions of prior art.

A rotorcraft may include one or more rotor systems. One example of a rotorcraft rotor system is a main rotor system. A main rotor system may generate aerodynamic lift to support the weight of the rotorcraft in flight and thrust to counteract aerodynamic drag and move the rotorcraft in forward flight. Another example of a rotorcraft rotor system is a tail rotor system. A tail rotor system may generate thrust to counter the torque effect created by the main rotor system.

The control systems for rotorcraft are complex electrical and/or mechanical systems. The control systems respond to the pilot's input, but also must accommodate external forces acting upon the rotor assemblies which are generally outside the control of the pilot. Mechanical control systems typically include a swashplate arrangement which consists of a non-rotating portion and a rotating portion. Pilot inputs applied to the nonrotating portion alter the vertical position of the swashplate through the collective control and the tilt of the swashplate through the cyclic control.

Most rotorcraft control systems incorporate hydraulic boost actuators to increase the control force of the pilot input to overcome the external forces acting on the main rotor system. In rotorcraft in which the control forces are so high that they cannot be moved without hydraulic assistance, two or more independent hydraulic boost systems may be incorporated as a failsafe.

Control input forces can be mechanically boosted in tail rotor systems through counterweights due to the high speed of rotation of tail rotors. However, heretofore, counterweight systems have not been applicable for mechanically boosting control inputs in main rotor systems.

SUMMARY

An exemplary rotorcraft includes a power train with an engine coupled to a gearbox, a main rotor blade having a mast coupled to the power train, a control input linkage in communication between a pilot input device and the main rotor blade configured to communicate a control input force from the pilot input device to the main rotor blade, and a counterweight system in connection with the control input linkage and the power train to apply a centrifugal force to the control input linkage.

An exemplary method of controlling rotorcraft flight includes receiving at a rotor blade device a control input force from a pilot input device via an input linkage and applying a centrifugal force produced by a counterweight system to the input linkage to boost the control input force.

This summary is provided to introduce a selection of concepts that are further described below in the detailed description. This summary is not intended to identify key or essential features of the claimed subject matter, nor is it intended to be used as an aid in limiting the scope of claimed subject matter.

BRIEF DESCRIPTION OF THE DRAWINGS

The disclosure is best understood from the following detailed description when read with the accompanying figures. It is emphasized that, in accordance with standard practice in the industry, various features are not drawn to scale. In fact, the dimensions of various features may be arbitrarily increased or reduced for clarity of discussion.

DETAILED DESCRIPTION

Figure 1:
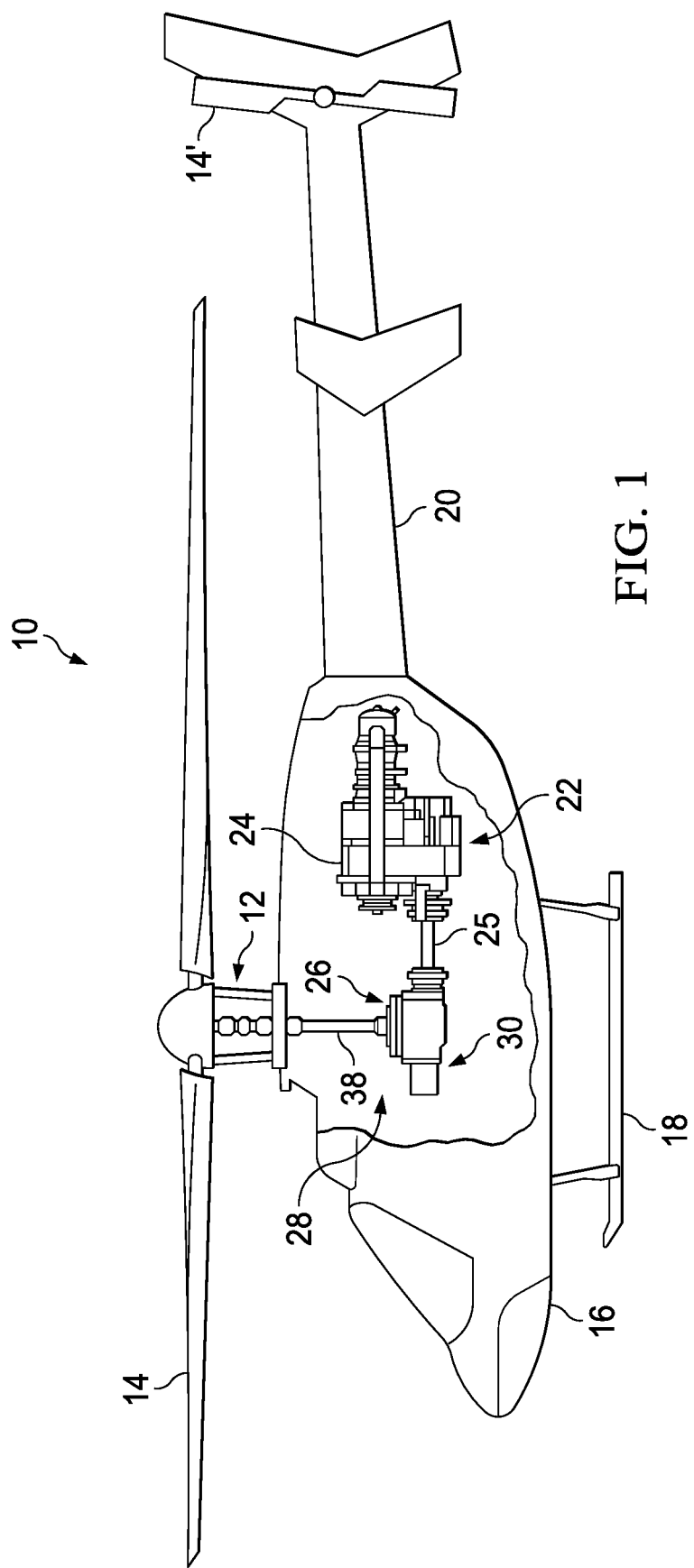
FIG. 1 illustrates a rotorcraft according to one or more aspects of the disclosure.

It is to be understood that the following disclosure provides many different embodiments, or examples, for implementing different features of various illustrative embodiments. Specific examples of components and arrangements are described below to simplify the disclosure. These are, of course, merely examples and are not intended to be limiting. For example, a figure may illustrate an exemplary embodiment with multiple features or combinations of features that are not required in one or more other embodiments and thus a figure may disclose one or more embodiments that have fewer features or a different combination of features than the illustrated embodiment. Therefore, combinations of features disclosed in the following detailed description may not be necessary to practice the teachings in the broadest sense and are instead merely to describe particularly representative examples. In addition, the disclosure may repeat reference numerals and/or letters in the various examples. This repetition is for the purpose of simplicity and clarity and does not itself dictate a relationship between the various embodiments and/or configurations discussed.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include such elements or features.

In the specification, reference may be made to the spatial relationships between various components and to the spatial orientation of various aspects of components as the devices are depicted in the attached drawings. However, as will be recognized by those skilled in the art after a complete reading of the present application, the devices, members, apparatuses, etc. described herein may be positioned in any desired orientation. Thus, the use of terms such as "inboard," "outboard, "above," "below," "upper," "lower," or other like terms to describe a spatial relationship between various components or to describe the spatial orientation of aspects of such components should be understood to describe a relative relationship between the components or a spatial orientation of aspects of such components, respectively, as the device described herein may be oriented in any desired direction. As used herein, the terms "connect," "connection," "connected," "in connection with," and "connecting" may be used to mean in direct connection with or in connection with via one or more elements. Similarly, the terms "couple," "coupling," and "coupled" may be used to mean directly coupled or coupled via one or more elements.

FIG. 1 illustrates an example rotorcraft 10 incorporating an active counterweight for the main rotor to mechanically boost control inputs. Rotorcraft 10 features a rotor system 12, blades 14, a fuselage 16, a landing gear 18, and an empennage 20. A drive system 22 is connected to rotor system 12 to rotate blades 14. Drive system 22 includes a driver 24, such as an engine or electric motor, coupled to a gearbox 26 by a drive shaft 25. Main rotor system 12 is connected to gearbox 26 and driver 24 through mast 38. Gearbox 26 generally reduces the rotational speed input by driver 24 to a lower main rotor speed that is output to mast 38. In a non-limiting example, gearbox 26 may provide a 6:1 reduction from a driver 24 speed of 2,700 rpm to a main rotor blade 14 speed of about 450 rpm.

Fuselage 16 represents the body of rotorcraft 10 and may be coupled to rotor system 12 such that rotor system 12 and blades 14 may move fuselage 16 through the air. Landing gear 18 supports rotorcraft 10 when rotorcraft 10 is landing and/or when rotorcraft 10 is at rest on the ground. Empennage 20 represents the tail section of the aircraft and features tail rotor blades 14'. Tail rotor blades 14' may provide thrust in the same direction as the rotation of main rotor blades 14 so as to counter the torque effect created by rotor system 12. Teachings of certain embodiments relating to rotor systems described herein may apply to rotor system 12 and/or other rotor systems, such as other tilt rotor and helicopter rotor systems.

Rotor system 12 may include a control system 28 for selectively controlling the pitch of each blade 14 in order to selectively control direction, thrust, and lift of rotorcraft 10. Control system 28 may receive control inputs (e.g., from a pilot, flight computer, and/or other flight control equipment) and change the pitch of each blade 14 based on these control inputs. Rotating blades 14 tend to move to zero pitch due to centrifugal force. This centrifugal force is an external force that must be overcome by the force of the control input to maintain or change blade pitch. Rotorcraft 10 incorporates an active counterweight system 30 to counter these external forces on rotor blades 14 and to boost the control input force.

Figure 2:
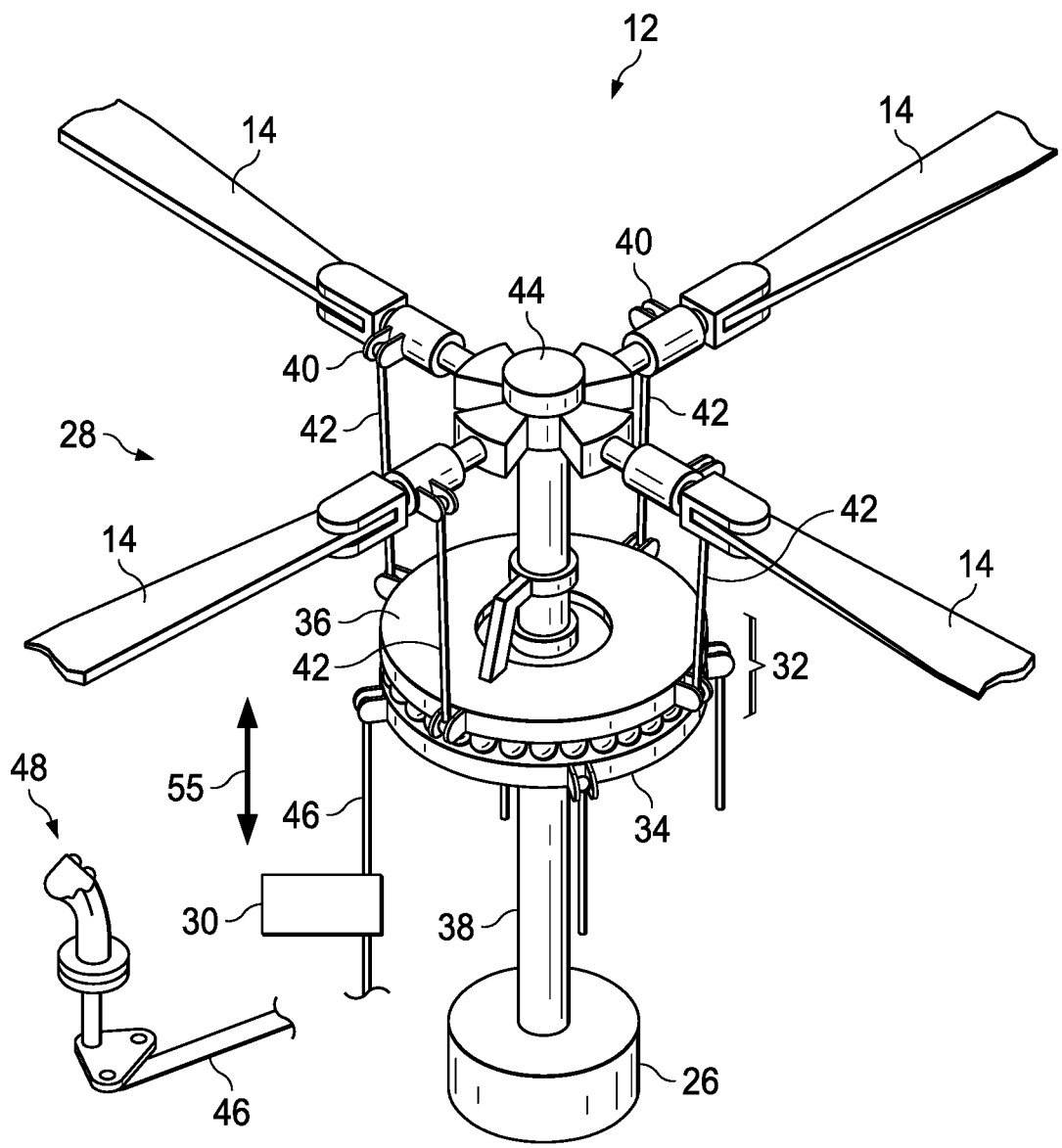
FIG. 2 illustrates an exemplary main rotor control system according to one or more aspects of the disclosure.

FIG. 2 illustrates an exemplary mechanical control system 28 for a main rotor system 12. Control system 28 is known as a swashplate control system and includes a swashplate 32 having a nonrotating member 34, e.g., plate, and a rotating member 36. A mast 38 extends through swashplate 32 and is coupled to main rotor blades 14. Each blade 14 is connected through a pitch horn 40 and a linkage, e.g., pitch link 42, back to nonrotating member 34 through a linkage, e.g., control input linkage 46, to pilot input device 48. A hub 44 is couples rotor blades 14 to mast 38 in a manner that transfers torque and thrust while allowing tilting of the rotor thrust vector. For example, in a mechanical system, the hub may comprise a gimbaled yoke, but in electromechanical systems may comprise other types of couplings.

Control system 28, depicted in simplified form in FIG. 2, allows for the combination of collective control and cyclic control. Both collective control and cyclic control are accomplished through swashplate 32, the engineering details of which vary between rotorcraft designs. As discussed above, rotating member 36 is free to rotate relative to nonrotating member 34. Pilot inputs, e.g., via input device 48, apply a control input force to alter the vertical position of swashplate 32 through the collective control and the tilt of swashplate 32 through the cyclic control. Since rotating member 36 always follows the orientation of nonrotating member 34, any pilot input through control input linkage 46 to nonrotating member 34 is passed onto rotating member 36 above it. Pitch link 42 and pitch horns 40 are utilized to allow rotating member 36 to alter the blade angle of each blade 14. Pulling the collective lever, e.g., input device 48, up moves the swashplate 32 vertically upward so that all blades 14 contain the same increase in blade angle, similarly, pushing the collective down decreases the blade angle of all blades 14. Counterweight system 30 is operationally connected with control input linkage 46 to boost the control input force 55 via input device 48 to swashplate 32.

Figure 3:
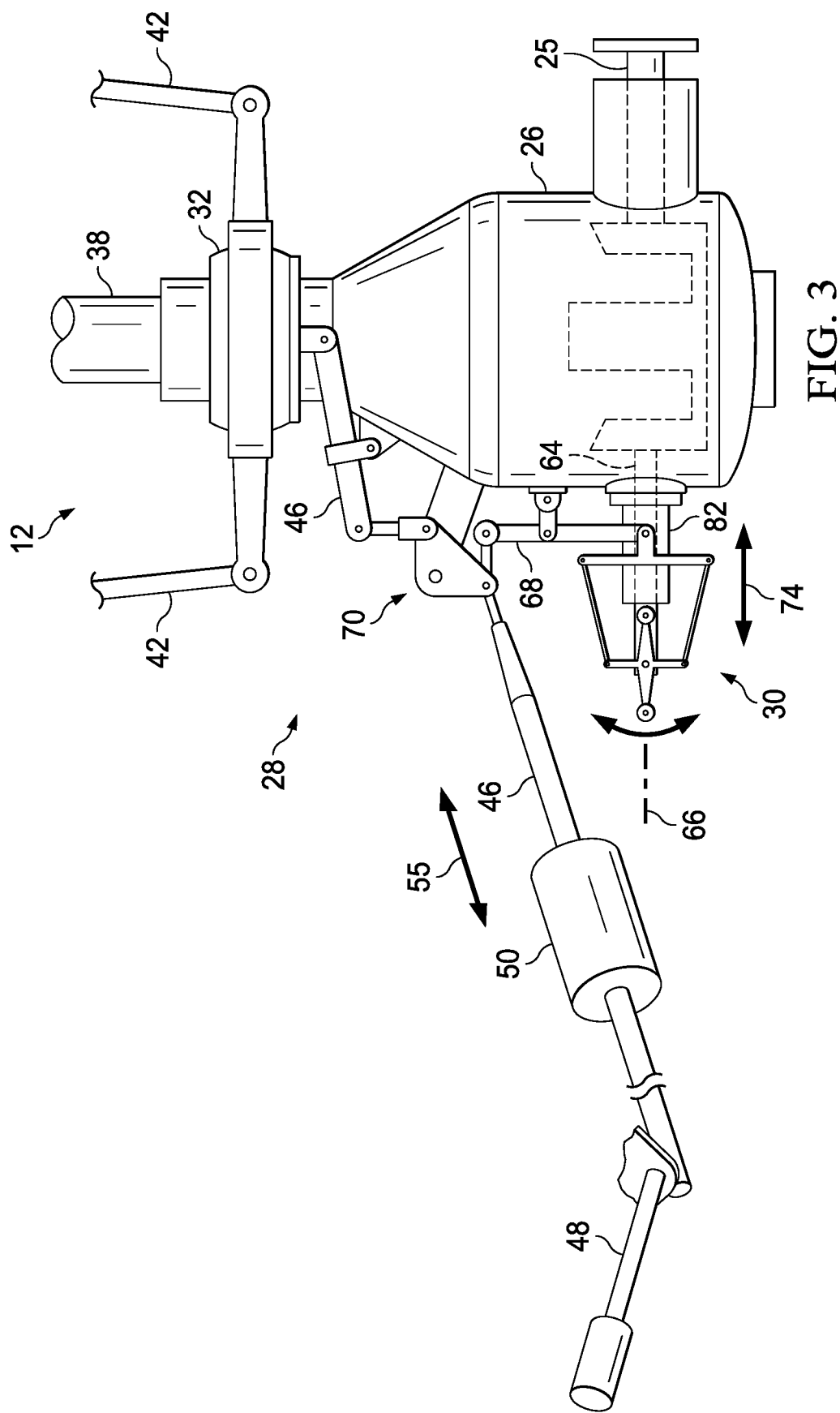
FIG. 3 illustrates an exemplary main rotor system according to one or more aspects of the disclosure.

FIG. 3 illustrates an example control system 28 incorporating an active counterweight system 30, described with additional reference to FIGS. 1 and 2. Control system 28 includes a pilot input device 48 operationally connected to swashplate 32. Control input linkage 46 communicates the pilot input, e.g., control input force 55, from input device 48 to swashplate 32 and main rotor system 12. Input device 48 may be a collective or cyclic control. In an embodiment, input device 48 is a collective control. In the FIG. 3 example, control system 28 includes a boost actuator 50 to provide an assisting force to the pilot's input to move the flight control input linkage 46 and swashplate 32.

Boost actuator 50 may represent a device configured to provide an output position proportional to a pilot input position but at increased (boosted) force output. In the example of FIG. 3, boost actuator 50 is located in series with the mechanical control input linkage 46 between the pilot's cockpit control input device 48 and swashplate 32. One example of a boost actuator may include a hydraulic boost actuator. A hydraulic boost actuator utilizes pressurized hydraulic fluid to provide the force necessary to operate against external flight loads, e.g. the control force. Hydraulic boost actuators, however, may require complex hydraulic systems to provide the hydraulic power source. Active counterweight system 30 mechanically boosts the force of the pilot's control input force 55 and counteracts a portion of the external flight loads on main rotor system 12. In some embodiments, a counterweight system 30 may counteract a sufficient portion of the external flight loads so that the pilot can provide the necessary input force to control the rotor system, at least for a short period of time to land the rotorcraft, thereby permitting the elimination of a second failsafe hydraulic boost system. In some embodiments, control system 28 does not include a hydraulic boost actuator 50.

Figure 4:
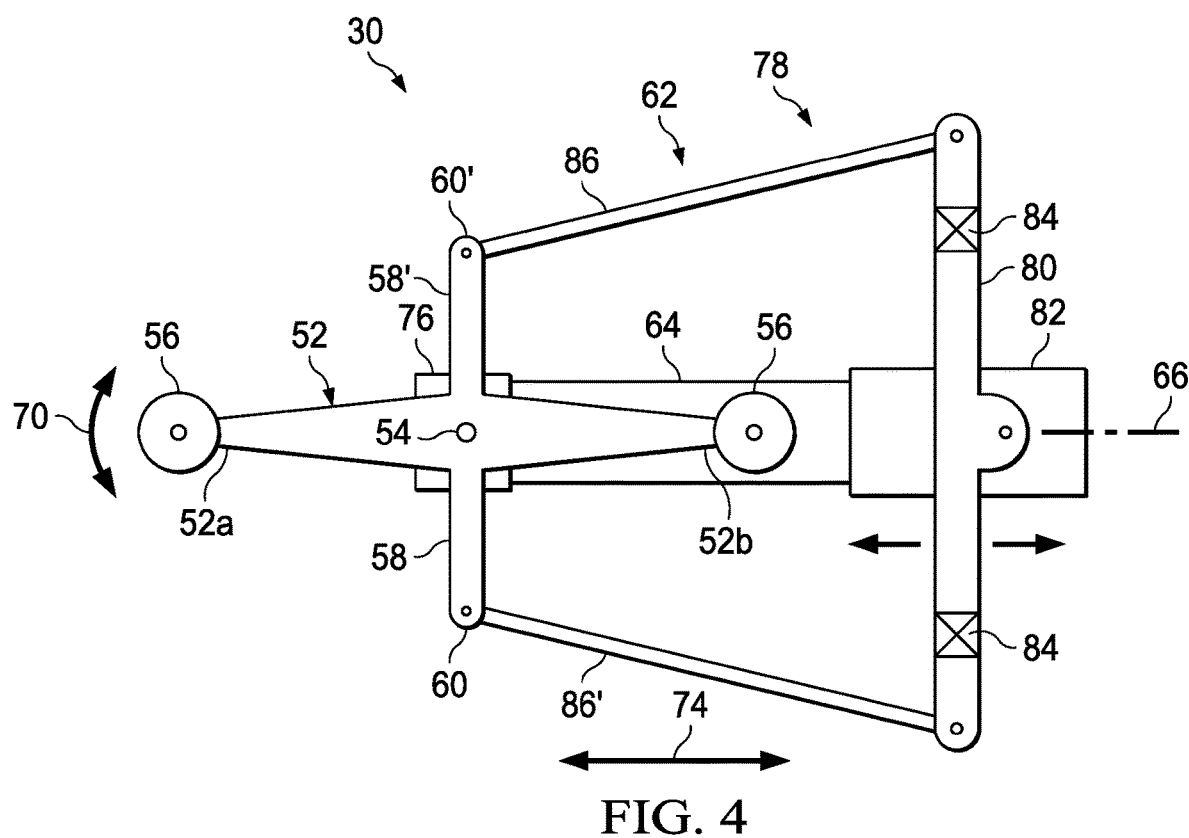
FIG. 4 illustrates an exemplary counterweight system according to one or more aspects of the disclosure.

With reference in particular to FIGS. 3 and 4, an exemplary active counterweight system 30 includes a counterweight bellcrank beam 52 having a central pivot 54 (e.g., fixed pivot) and weights 56 located on the opposite extremities 52a, 52b of bellcrank beam 52 and symmetrically disposed about pivot 54. Pivot 54 includes a trunnion 76 attached to output quill 64 such that pivot 54 and bellcrank beam 52 rotate with quill 64 about axis 66. Pivot 54 extends orthogonal to output quill 64 and rotational axis 66. Bellcrank beam 52 includes an offset control arm 58 having an end 60 connected to a blade pitch control linkage, e.g., collective control input linkage 46, such that movement of the control input linkage swings counterweights 56 about pivot 54. In the illustrated example, bellcrank beam 52 includes a first control arm 58 and a second control arm 58' extending away from each other to opposite ends 60, 60'. Control arms 58, 58' are connected at ends 60, 60' to a transfer assembly 62 to convert the pivoting action of bellcrank beam 52 to a linear motion to translate with swashplate 32 and to create a force counter to the external flight forces acting on the main rotor blades 14.

Transfer assembly 62 includes a rotating portion 78 and a non-rotating portion 80. Non-rotating portion 80 is mounted on a sleeve 82 that is attached to gearbox 26 and through which output quill 64 extends. Non-rotating portion 80 does not rotate with output quill 64. In this example, non-rotation portion 80 translates axially along sleeve 82. Rotating section 78 is connected to bellcrank beam 52 and to non-rotating section 80 through a thrust bearing 84 so that rotating section 78 rotates with output quill 64 and bellcrank beam 52. Rotating section 78 includes a first link 86 connected to first control arm 58 at end 60 and to non-rotation section through thrust bearing 84 and a second link 86' connected to second control arm 58' at end 60' and to non-rotation section through thrust bearing 84.

The centrifugal force generated by counterweights is primarily a function of angular velocity (revolutions per minute (RPM)). Unlike tail rotors, main rotors do not operate at high enough speeds to create the centrifugal force necessary to significantly reduce the external forces acting on the main rotor system 12. For example, there may be a 3:1 to 6:1 speed ratio between the speed of the tail rotor and the main rotor. Additionally, the external forces acting on the main rotor system and therefore the magnitude of the control boost loads for main rotor systems is greater than that required for tail rotor system.

To create sufficient centrifugal force, counterweight system 30 is driven at a rotational speed greater than mast 38 and main rotor blades 14. For example, counterweight system 30 may be driven at a rotation speed of four, five, or more times greater than main rotor blades 14. In an embodiment, counterweight system 30 is driven at about 2,000 rpm or greater. To obtain the desired centrifugal force for rotorcraft 10, counterweight system 30 is connected to output quill 64, i.e., shaft, of gearbox 26 to be driven at a greater rotational speed than mast 38 and main rotor blades 14. Pivot 54 extends orthogonal to rotational axis 66 and bellcrank beam 52 and pivot 54 rotate with output quill 64. In the illustrated embodiment, axis 66 is generally orthogonal to mast 38. Counterweight system 30 is connected to control input linkage 46 so that the centrifugal force induced by rotating counterweight system 30 is applied to control input linkage 46 to boost the control input force 55. In the illustrated example, counterweight system 30 is operationally connected to swashplate 32 through control input linkage 46, counterweight boost linkage 68, and bellcrank 70.

Bellcrank beam 52 is aligned in the plane of axis 66 in FIGS. 3 and 4, which is an unstable position. In an embodiment, counterweight system 30 is configured with bellcrank beam 52 and counterweights 56 aligned in the plane with output quill axis 66 when main rotor blades 14 are at a zero pitch. When output quill 64 is rotating, centrifugal force acting on weights 56 tends to move weights 56 about pivot 54, as shown by arrow 72, toward a position with bellcrank beam 52 orthogonal to axis 66. The connection of counterweight system 30 to control linkage 46 prevents beam 52 from moving to the stable position orthogonal to axis 66 and reacts centrifugal force 74 through control linkage 46 to swashplate 32. In the illustrated example, counterweight system 30 is operationally connected to control input linkage 46 so that centrifugal force 74 tends to move weights 56 in a direction opposing the external forces that urge blades 14 to a zero pitch. This opposing centrifugal force 74 is reacted in FIG. 3 through counterweight boost linkage 68 to control input linkage 46 and swashplate 32 thereby boosting the pilot control input force 55. In an embodiment, active counterweight system 30 is boosting the collective controls and therefore counteracting the steady loads acting on rotor system 12.

The term "substantially," "approximately," and "about" is defined as largely but not necessarily wholly what is specified (and includes what is specified; e.g., substantially 90 degrees includes 90 degrees and substantially parallel includes parallel), as understood by a person of ordinary skill in the art. In any disclosed embodiment, the terms "substantially," "approximately," and "about" may be substituted with "within [a percentage] of" what is specified, where the percentage may include for example 0.1, 1, and 5 percent as may be recognized by a person skilled in the art.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure and that they may make various changes, substitutions, and alterations without departing from the spirit and scope of the disclosure. The scope of the invention should be determined only by the language of the claims that follow. The term "comprising" within the claims is intended to mean "including at least" such that the recited listing of elements in a claim are an open group. The terms "a," "an" and other singular terms are intended to include the plural forms thereof unless specifically excluded.

What is claimed is:

1. A rotorcraft, comprising:
   a power train comprising an engine coupled to a gearbox;
   a main rotor blade having a mast coupled to the power train;
   a control input linkage in communication between a pilot input device and the main rotor blade, the control input linkage configured to communicate a control input force from the pilot input device to the main rotor blade; and
   a counterweight system connected to an output shaft of the gearbox and in connection with the control input linkage and the power train, the counterweight system configured to apply a centrifugal force to the control input linkage.

2. The rotorcraft of claim 1, wherein the output shaft rotating at a greater speed than the main rotor blade.

3. The rotorcraft of claim 1, wherein the output shaft is generally orthogonal to the mast.

4. The rotorcraft of claim 3, wherein the output shaft rotates at a higher speed than the mast.

5. The rotorcraft of claim 1, wherein the control input linkage is in communication with the main rotor blade to change a pitch of the main rotor blade in response to the control input force.

6. The rotorcraft of claim 1, wherein the pilot input device is a collective.

7. The rotorcraft of claim 1, further comprising a hydraulic boost actuator in connection with the control input linkage.

8. The rotorcraft of claim 1, wherein the counterweight system comprises a beam having a central pivot and weights located on opposite ends;
   the beam is attached to the output shaft of the gearbox such that the beam and the central pivot rotate with the output shaft, wherein the central pivot is orthogonal to the output shaft; and
   the control input linkage is connected to the beam.

9. The rotorcraft of claim 8, wherein the output shaft is oriented generally orthogonal to the mast.

10. The rotorcraft of claim 8, further comprising a swashplate connected between the control input linkage and the main rotor blade, wherein the swashplate is located between the main rotor blade and the counterweight system.

11. The rotorcraft of claim 10, wherein the output shaft is oriented generally orthogonal to the mast.

12. The rotorcraft of claim 8, further comprising a hydraulic boost actuator in connection with the control input linkage.

13. The rotorcraft of claim 8, further comprising a hydraulic boost actuator in connection with the control input linkage; and
   a swashplate connected between the control input linkage and the main rotor blade, wherein the swashplate is located between the main rotor blade and the counterweight system.

14. A rotorcraft comprising:
   a power train comprising an engine coupled to a gearbox;
   a main rotor blade having a mast coupled to the power train;
   a control input linkage in communication between a pilot input device and the main rotor blade, the control input linkage configured to communicate a control input force from the pilot input device to the main rotor blade;
   a swashplate connected between the control input linkage and the main rotor blade; and
   a counterweight system in connection with the control input linkage and the power train, the counterweight system configured to apply a centrifugal force to the control input linkage.

15. The rotorcraft of claim 14, wherein the swashplate is located between the main rotor blade and the counterweight system.

16. A method of controlling rotorcraft flight, comprising:
   receiving at a swash plate a control input force from a pilot input device via an input linkage; and
   applying a centrifugal force produced by a counterweight system to the input linkage to boost the control input force.

17. The method of claim 16, further comprising changing a pitch angle of a rotor blade in response to receiving the boosted control input force.

18. The method of claim 16, wherein the applying the centrifugal force comprises rotating the counterweight system at a greater speed than a rotor blade; and
   further comprising changing a pitch angle of the rotor blade in response to receiving the boosted control input force.

19. The method of claim 18, wherein the rotor blade is connected to a mast and the counterweight system is rotated about an axis, wherein the axis is generally orthogonal to the mast.

* * * * *